United States Patent
Albertson et al.

(10) Patent No.: US 9,483,206 B1
(45) Date of Patent: Nov. 1, 2016

(54) IMPLEMENTING SYNCHRONIZATION FOR REMOTE DISK MIRRORING

(71) Applicant: International Business Machines Corporation, Armonk, NY (US)

(72) Inventors: Aaron T. Albertson, Rochester, MN (US); Robert Miller, Rochester, MN (US); Brian A. Nordland, Rochester, MN (US); Kiswanto Thayib, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/064,342

(22) Filed: Mar. 8, 2016

Related U.S. Application Data (63) Continuation of application No. 14/969,785, filed on Dec. 15, 2015.

(51) Int. Cl.
*G06F 3/00* (2006.01)
*G06F 3/06* (2006.01)

(52) U.S. Cl.
CPC ............ *G06F 3/065* (2013.01); *G06F 3/0653* (2013.01)

(58) Field of Classification Search
None
See application file for complete search history.

(56) References Cited

U.S. PATENT DOCUMENTS

| | | | |
|---|---|---|---|
| 5,559,991 A | 9/1996 | Kanfi | |
| 6,601,187 B1 | 7/2003 | Sicola et al. | |
| 6,658,540 B1 | 12/2003 | Sicola et al. | |
| 8,099,605 B1 * | 1/2012 | Billsrom | G06F 11/1448 713/187 |
| 8,671,255 B2 | 3/2014 | Lam et al. | |
| 2003/0005306 A1 | 1/2003 | Hunt et al. | |
| 2003/0069889 A1 | 4/2003 | Ofek | |
| 2004/0044865 A1 | 3/2004 | Sicola et al. | |
| 2005/0154847 A1 | 7/2005 | Trembecki | |
| 2007/0250673 A1 | 10/2007 | Eidswick | |
| 2008/0222373 A1 | 9/2008 | Garimella | |
| 2013/0054524 A1 | 2/2013 | Anglin et al. | |
| 2013/0080394 A1 | 3/2013 | Petruzzo | |
| 2013/0151472 A1 | 6/2013 | Niles et al. | |
| 2015/0113095 A1 | 4/2015 | McCabe et al. | |

OTHER PUBLICATIONS

Appendix P—List of IBM Patents or Patent Applications Treated as Related—Mar. 27, 2016.

* cited by examiner

*Primary Examiner* — David X Yi
*Assistant Examiner* — Craig Goldschmidt
(74) *Attorney, Agent, or Firm* — Joan Pennington (57) ABSTRACT

A method, and system for implementing enhanced fast full synchronization for remote disk mirroring in a computer system. A source backup copy is made locally available to a target for remote disk mirroring. Sectors are identified that are different between the source and target. A hash function is used over a block to be compared, with an adaptive number of tracking sectors per block, starting with a minimum block size.

9 Claims, 6 Drawing Sheets

| BLOCK NUMBER | BLOCK SIZE | TRACKING SECTORS | HASHES MATCH | TRACKING SPACE BIT MAP T12  T8   T4   T0 |
|---|---|---|---|---|
| INITIALIZE | 1 | S0 |  | 0000 0000 0000 0000 |
| B1 | 1 | S0 | YES | 0000 0000 0000 0000 |
| B2 | 2 | S1-S2 | YES | 0000 0000 0000 0000 |
| B3 | 4 | S3-S6 | YES | 0000 0000 0000 0000 |
| B4 | 8 | S7-S14 | NO | 0000 0000 0000 0000 |
| B5 | 1 | S7 | YES | 0000 0000 0000 0000 |
| B6 | 2 | S8-S9 | YES | 0000 0000 0000 0000 |
| B7 | 4 | S10-S13 | NO | 0000 0000 0000 0000 |
| B8 | 1 | S10 | NO | 0000 0100 0000 0000 |
| B9 | 1 | S11 | NO | 0000 1100 0000 0000 |
| B10 | 1 | S12 | YES | 0000 1100 0000 0000 |
| B11 | 2 | S13-S14 | YES | 0000 1100 0000 0000 |

IMPLEMENTING SYNCHRONIZATION FOR REMOTE DISK MIRRORING

This application is a continuation application of Ser. No. 14/969,785 filed Dec. 15, 2015.

FIELD OF THE INVENTION

The present invention relates generally to the data processing field, and more particularly, relates to a method, system and memory controller for implementing enhanced fast full synchronization for remote disk mirroring.

DESCRIPTION OF THE RELATED ART

Remote disk mirroring copies disk sectors from source disks to target disks by sending the sectors through a network to the target. A change to a disk sector on a source disk is mirrored or copied to the target disk. An example is SAN (Storage Area Network) mirroring, such as IBM SVC (SAN Volume Controller) Metro and Global Mirror.

The primary purpose of remote disk mirroring is to have a remote backup copy of the source in case the source fails. A tracking space is used to keep track of changes on the source that haven't been copied to the target. Typically a tracking space is a bit map of tracking sectors, which are a fixed number of adjacent disk sectors. If the bit is on, then the corresponding disk sectors for that tracking sector are to be copied. In this way, a source can accumulate changes to send to the target, and as long as the source does not lose its tracking, a target can be synchronized.

A full synchronization occurs when the target gets a complete copy of the source. A full synchronization is required when the tracking space between the source and the target is lost or no longer valid. This may happen, for example, in the event of the failure of the source or target, a new target for the source, or a new source for the target.

A full synchronization is to be avoided as much as possible due to the amount of time and network bandwidth a full synchronization may take. Depending on the amount of data and network speed, a full synchronization could take days. The greater the distance between source and target, typically the greater the time for a full synchronization due to the round trip latency of acknowledgments and messages.

It is not possible to eliminate all full synchronizations. For example, a new target needs to have a full copy of the source, and hardware failures do occur with a corresponding loss of data.

A need exists for an effective mechanism to reduce the time required for full synchronization for remote disk mirroring.

SUMMARY OF THE INVENTION

Principal aspects of the present invention are to provide a method, system and memory controller for implementing enhanced fast full synchronization for remote disk mirroring in a computer system. Other important aspects of the present invention are to provide such method, system, and memory controller substantially without negative effects and that overcome many of the disadvantages of prior art arrangements.

A source backup copy is made locally available to a target for remote disk mirroring. The backup copy can be applied to the target. Sectors that are different between the source and the target are identified. A hash function is used over a block to be compared, with the block being made up of an adaptive number of tracking sectors. Blocks will start with a minimum block size, such as 1 tracking sector.

In accordance with features of the invention a selected hash function is used, such as cryptographic hash algorithms SHA-1 (Secure Hash Algorithm 1) or SHA-2 (Secure Hash Algorithm 2).

In accordance with features of the invention, when the hashes match between source and target, the next block size is increased by an integral number of tracking sectors. When the hashes do not match, then the block size is reduced by an integral number of tracking sectors until the minimum block size is reached or the hashes match.

In accordance with features of the invention, a tracking space bit map for remote disk mirroring is used for full synchronization. Initially, all the tracking space bits on the source are turned off indicating all tracking sectors are synchronized. While the full synchronization is comparing hashes no tracking sectors are sent. A tracking space bit is set to 1 if a corresponding tracking sector is changed on the source during the full synchronization. This allows concurrent source changes while the full synchronization is being performed.

In accordance with features of the invention, if a hash does not match and the block is the minimum block size then the tracking space bits for all tracking sectors in the block are set to 1. After all hashes have been compared, the tracking space will have a 1 for each tracking sector that needs to be sent to the target. The tracking space accurately reflects the changed tracking sectors between the source and the target, and the remote disk mirroring can begin sending the changed tracking sectors using standard remote disk mirroring algorithms.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and memory controller are provided for implementing enhanced fast full synchronization for remote disk mirroring in a computer system.

In accordance with features of the invention, a static table of hashes is not used and so there is no overhead associated with maintaining such tables. Hashes are computed when needed. An adaptive number of tracking sectors is included in a block. Spatial locality is used to increase or decrease block size based on whether hashes match between the source and target. A remote disk mirroring tracking space bit map is used.

Figure 1A:
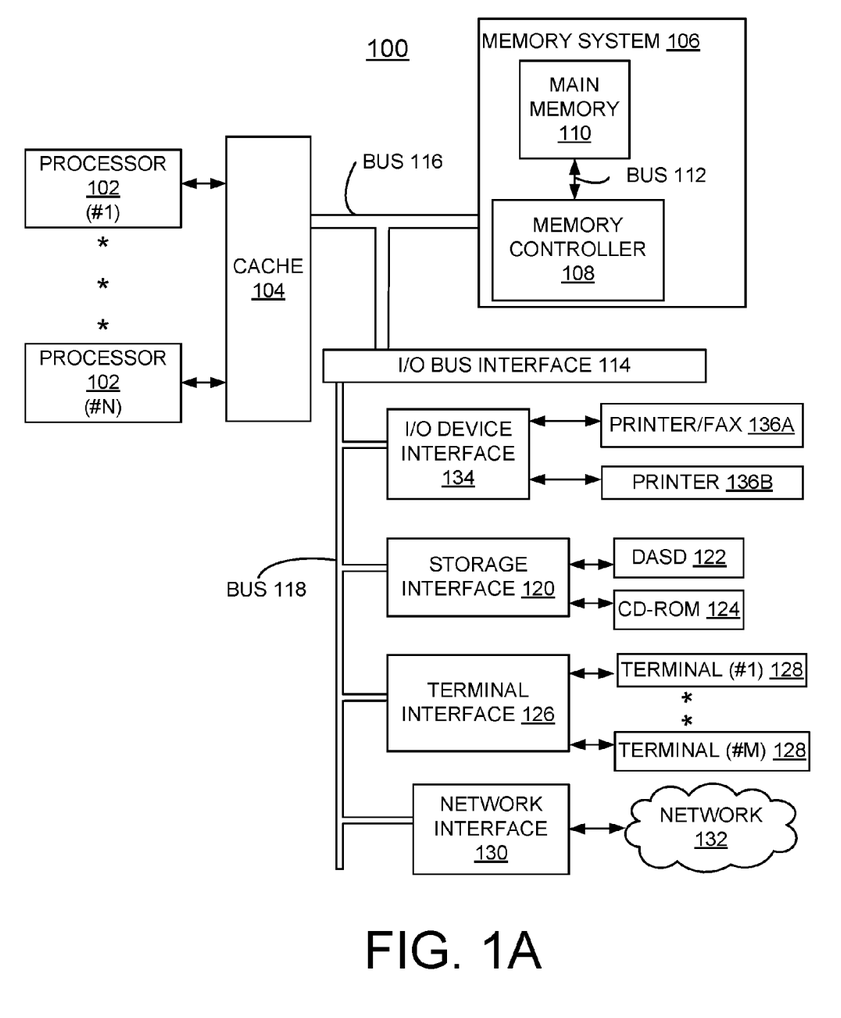
FIGS. 1A and 1B provide a block diagram of an example computer system embodying the present invention.
Figure 1B:
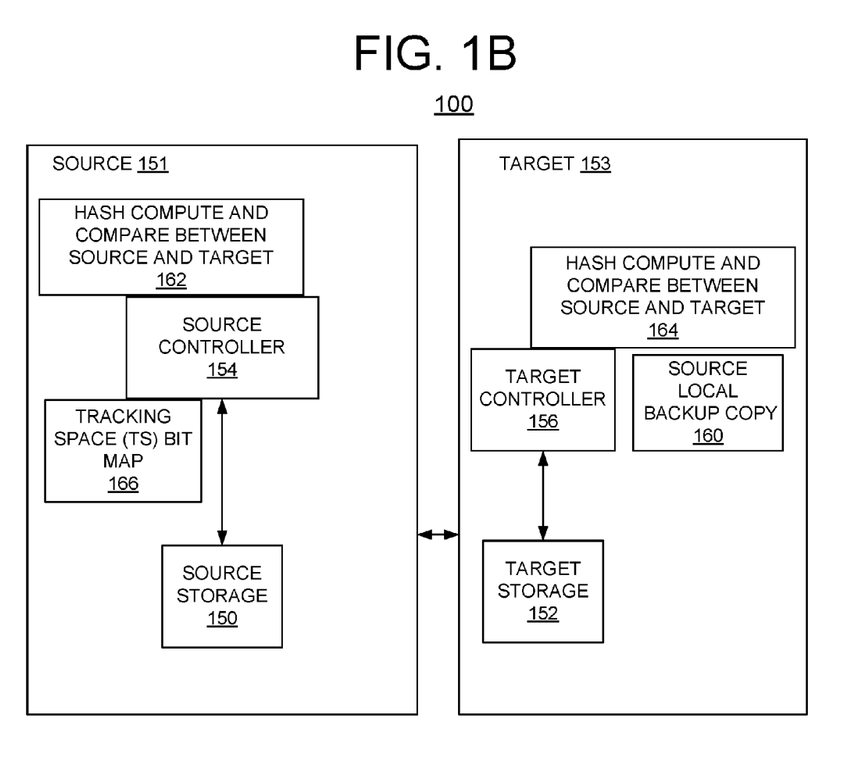

Having reference now to the drawings, in FIGS. 1A and 1B, there is shown a computer system embodying the present invention generally designated by the reference character 100 for implementing enhanced fast full synchronization for remote disk mirroring in accordance with the preferred embodiment. Computer system 100 includes one or more processors 102 or general-purpose programmable central processing units (CPUs) 102, #1-N. As shown, computer system 100 includes multiple processors 102 typical of a relatively large system; however, system 100 can include a single CPU 102. Computer system 100 includes a cache memory 104 connected to each processor 102.

Computer system 100 includes a memory system 106 including a memory controller 108 and a main memory 110 connected by a bus 112. Bus 112 is one or more busses that send address/command information to main memory 110 and send and receive data from the memory 110. Main memory 110 is a random-access semiconductor memory for storing data, including programs. Main memory 110 is comprised of, for example, a dynamic random access memory (DRAM), a synchronous direct random access memory (SDRAM), a current double data rate (DDRx) SDRAM, non-volatile memory, optical storage, and other storage devices.

I/O bus interface 114, and buses 116, 118 provide communication paths among the various system components. Bus 116 is a processor/memory bus, often referred to as front-side bus, providing a data communication path for transferring data among CPUs 102 and caches 104, memory controller 108 and I/O bus interface unit 114. I/O bus interface 114 is further coupled to system I/O bus 118 for transferring data to and from various I/O units.

As shown, computer system 100 includes a storage interface 120 coupled to storage devices, such as a direct access storage device (DASD) 122 and a CD-ROM 124. Computer system 100 includes a terminal interface 126 coupled to a plurality of terminals 128, #1-M, a network interface 130 coupled to a network 132, such as the Internet, local area, or other networks, and an I/O device interface 134 coupled to I/O devices, such as a first printer/fax 136A and a second printer 136B.

I/O bus interface 114 communicates with I/O interface units 120, 126, 130, and 134, which are also known as I/O processors (IOPs) or I/O adapters (IOAs), through system I/O bus 118. System I/O bus 118 is, for example, an industry standard PCI bus, or other appropriate bus technology.

Referring to FIG. 1B, computer system 100 includes a source storage 150 on a source 151 and a target storage 152 on a target 153 coupled to respective controllers 154 and 156, a source local backup copy 160 locally available to the target for remote disk mirroring, a hash compare between source and target 162 on the source, a hash compare between source and target 164 on the target, and a tracking space (TS) bit map 166 for remote disk mirroring used for full synchronization.

Computer system 100 is shown in simplified form sufficient for understanding the present invention. The illustrated computer system 100 is not intended to imply architectural or functional limitations. The present invention can be used with various hardware implementations and systems and various other internal hardware devices.

In accordance with features of the invention, when the hashes match between source and target, the next block size is increased by an integral number of tracking sectors. When the hashes do not match, then the block size decreased by an integral number of tracking sectors, to a minimum of the minimum tracking block size.

In accordance with features of the invention, if a hash does not match and the block is the minimum block size then the tracking space bits for all tracking sectors in the block are set to 1. After all hashes have been compared, the tracking space will have a 1 for each tracking sector that needs to be sent to the target. The tracking space accurately reflects the changed tracking sectors between the source and the target, and the remote disk mirroring can begin sending the changed tracking sectors using standard remote disk mirroring algorithms.

In accordance with features of the invention, a tracking space bit map for remote disk mirroring is used for the full synchronization. Initially, all the tracking space bits on the source are turned off indicating all tracking sectors are synchronized. While the full sync is comparing hashes, no tracking sectors are sent, but a tracking space bit is set to 1 if a corresponding tracking sector is changed on the source during the full synchronization. This allows concurrent source changes while the full synchronization is being performed.

Figure 2A:
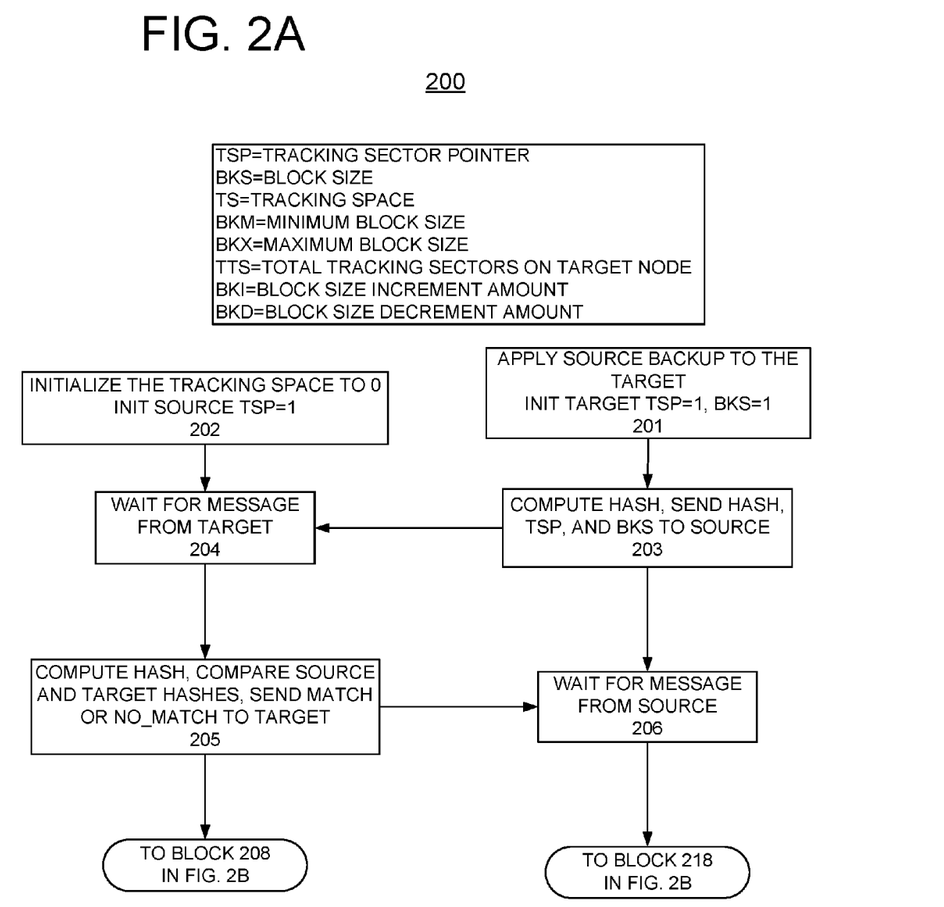
FIGS. 2A and 2B together provide a flow diagram illustrating example steps for implementing enhanced fast full synchronization for remote disk mirroring in the computer system of FIG. 1 in accordance with preferred embodiments.
Figure 2B:
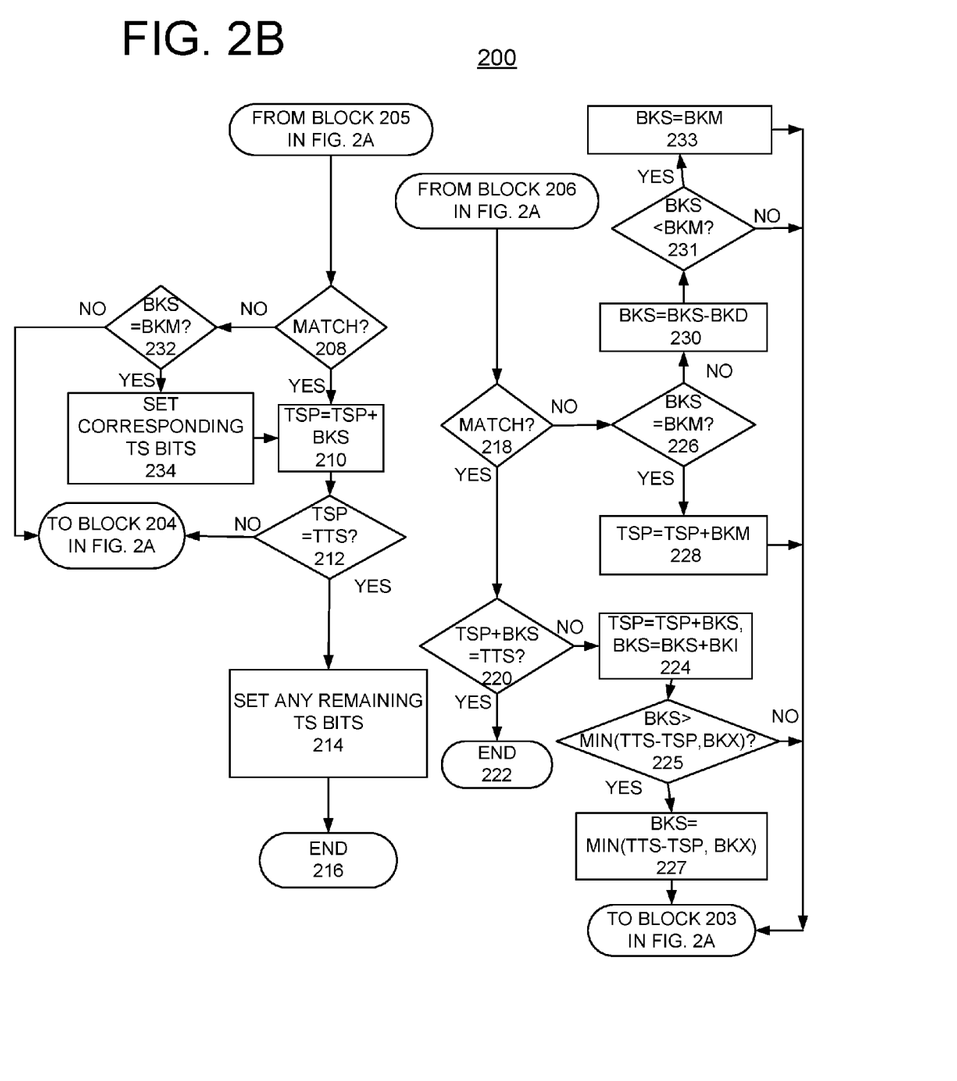

Referring now to FIGS. 2A and 2B there are shown example steps generally designated by the reference character 200 for implementing enhanced fast full synchronization for remote disk mirroring in the computer system 100 in accordance with the preferred embodiment. In FIGS. 2A and 2B, TSP represents a tracking sector pointer, BKS represents block size, BKM represents minimum block size, BKX represents the maximum block size, REM represents the remaining tracking sectors on the target node, BKI represents the amount the block size is incremented by, and BKD represents the amount the block size is decremented by. As indicated at a block 201, the target is initialized and a backup or previous version is loaded on the target with BKS set to 1 tracking sector and TSP set to tracking sector 1. As indicated at a block 202, on the source the tracking space is created with all bits set to 0 and the TSP is set to tracking sector 1. On the target, as indicated at a block 203 the block hash is computed based on the tracking sector pointer and the block size, and the computed hash, tracking sector pointer and block size are sent to the source. As indicated at a block 204, the source waits for a message from the target. On the source, the corresponding block hash is computed, the generated hash is compared to the hash received from the target, and a Match or No_Match message is sent to the target as indicated at a block 205. A selected hash function is used, such as cryptographic hash algorithms SHA-1 (Secure Hash Algorithm 1) or SHA-2 (Secure Hash Algorithm 2) at blocks 203 and 205. On the target, as indicated at a block 206 the target waits for a message from the source. Then operations continue as shown in FIG. 2B.

In FIG. 2B on the source, when the hashes match as indicated at a decision block 208 the source increments the tracking sector pointer by the number of tracking sectors in the block or TSP=TSP+BKS as indicated at a block 210. Checking for more sectors is performed as indicated at a decision block 212, the source returns to block 204 in FIG. 2A if there are more sectors. If the target has no more sectors, any remaining tracking space (TS) bits on the source are set to 1 as indicated at a block 214, and operations end as indicated at a block 216.

On the target, when the hashes match as indicated at a decision block 218, the target checks if there are more tracking sectors as indicated at a decision block 220, and if there are no more tracking sectors operations end as indicated at a block 222. If there are more tracking sectors at decision block 220, then the target increments the tracking sector pointer by the block size and the block size is increased by the block size increment as indicated at a block 224. Then the block size is compared to the minimum of the remaining number of tracking sectors and the maximum block size at a decision block 225. If the block size is greater than the minimum of the remaining number of tracking sectors and the maximum block size at decision block 225 then the block size is set to the minimum of the remaining number of tracking sectors and the maximum block size at a block 227. Then the target operations return to block 203 in FIG. 2A. If the block size is less than or equal to the minimum of the remaining number of tracking sectors and the maximum block size at decision block 225 then the target operations return to block 203 in FIG. 2A.

On the target, when no match is found at decision block 218, the block size is compared to the minimum block size as indicated at a decision block 226. If the block size is the minimum block size the target increments the tracking sector pointer by the minimum block size as indicated at a block 228. Then the target operations return to block 203 in FIG. 2A. If the block size is not the minimum block size, the target reduces the block size by the block size decrement value as indicated at a block 230. The block size is compared to the minimum block size at a decision block 231. If the block size is greater than or equal to the minimum block size then the target operations return to block 203 in FIG. 2A. If the block size is less than the minimum block size at a block 231 the block size is set to the minimum block size at a block 233. Then the target operations return to block 203 in FIG. 2A.

On the source, when no match is found at decision block 208, the block size is compared to the minimum block size at a decision block 232. As indicated at a block 234 if the block size is equal to the minimum block size the source sets the corresponding tracking space bits to 1, indicating the tracking sectors are to be sent. Then the source operations return to block 210. If the block size is not the minimum block size the source returns operations to block 204 in FIG. 2A.

Figure 3:
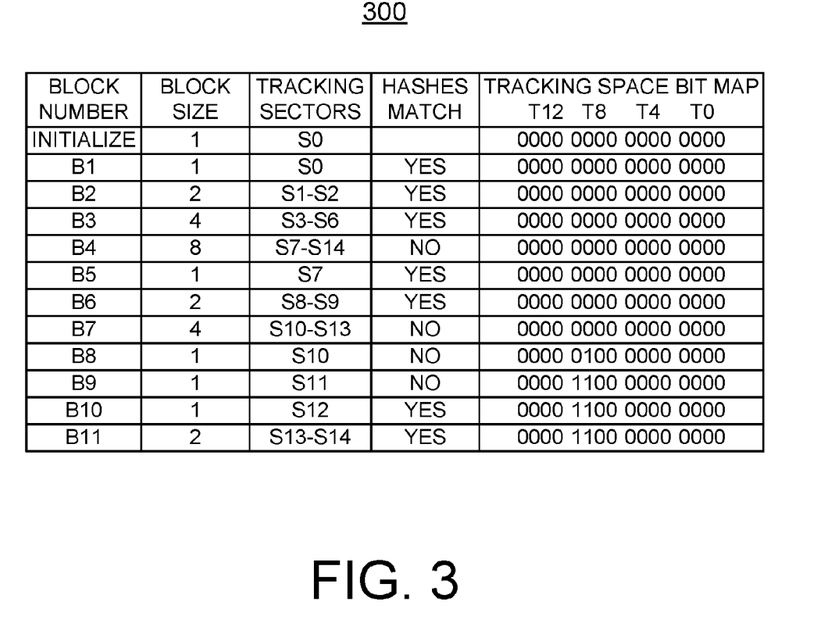
FIG. 3 illustrates the example steps of FIG. 2 in accordance with the preferred embodiments for an example tracking space bit map, where the block size is doubled when hashes match, the block size is reduced to the minimum block size when hashes do not match, and the minimum block size is 1 tracking sector.

Referring now to FIG. 3, there is shown example tracking space bit map designated by the reference character 300 illustrating the example steps for implementing enhanced fast full synchronization for remote disk mirroring in accordance with the preferred embodiments. This example assumes a minimum block size of 1 tracking sector, a block increment value equal to the current block size, and a block decrement value equal to one less than the current block size. In the tracking space bit map 300, S0 through SN are the tracking sectors represented by the tracking space bit map. Sectors S10 and S11 are changed. The tracking space has n+1 bits, T0 through TN, which correspond to each of the sectors. Each row is a block that is sent.

The full synchronization starts at row 1 in FIG. 3, with block B1 at the minimum size of 1 tracking sector (sector S0). The B1 hash will match on source and target, so the next block B2 is doubled to 2 tracking sectors (sectors S1-S2). B2 also matches, so the block size for B3 is doubled to 4 tracking sectors (sectors S3-S6). The block size continues to double if the hashes match, to a maximum size which is dependent on the hash used and the total number of tracking sectors.

Block B4 has 8 tracking sectors (sectors S7-S14), but has a hash mismatch. Block B5 starts with the minimum block size of 1 tracking sector (sector S7), which matches. Block B6 is now doubled to 2 tracking sectors (sectors S8-S9), which also match. Block B7 is doubled to 4 sectors (sectors S10-S13), but has a hash mismatch.

Block B8 then starts again with 1 tracking sector (sector S10). The hash for B8 doesn't match, and since it is only 1 tracking sector the block is considered processed and the tracking space bit for S10 is set. Block B9 block size remains at 1 tracking sector (sector S11). The hash for B9 does not match, so the tracking space bit for S11 is set, and block B10 will have the next tracking sector (sector S12). The B10 hash matches, so block B11 will contain the next 2 sectors (sectors S13-S14).

Using this example shown in FIG. 3, only 2 tracking sectors are sent from source to target, rather than 15 tracking sectors. Regarding hashes, 11 are sent using adaptive blocks compared to 15 hashes if a hash is sent for each tracking sector. The hash saving may not seem significant, but depending on the distribution of the changed tracking sectors the number of hashes sent with the method of the invention can be much less. For example, if there had been no changed tracking sectors, then the method of the invention would use 4 hashes compared to 15 hashes if one hash is sent per tracking sector.

Figure 4:
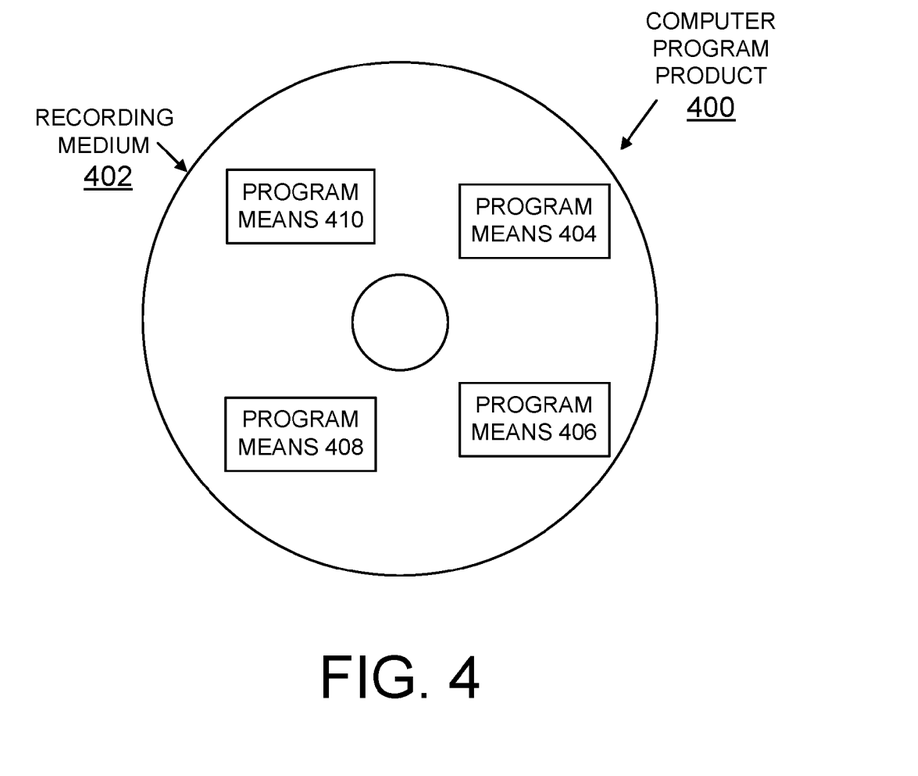
FIG. 4 is a block diagram illustrating a computer program product in accordance with the preferred embodiment.

Referring now to FIG. 4, an article of manufacture or a computer program product 400 of the invention is illustrated. The computer program product 400 is tangibly embodied on a non-transitory computer readable storage medium that includes a recording medium 402, such as, a floppy disk, a high capacity read only memory in the form of an optically read compact disk or CD-ROM, a tape, or another similar computer program product. Recording medium 402 stores program means 404, 406, 408, and 410 on the medium 402 for carrying out the methods for implementing enhanced fast full synchronization for remote disk mirroring of the preferred embodiment in the system 100 of FIG. 1.

A sequence of program instructions or a logical assembly of one or more interrelated modules defined by the recorded program means 404, 406, 408, and 410, direct the memory controller 108, computer system 100, and memory subsystem 200 for implementing enhanced fast full synchronization for remote disk mirroring of the preferred embodiment.

While the present invention has been described with reference to the details of the embodiments of the invention shown in the drawing, these details are not intended to limit the scope of the invention as claimed in the appended claims.

What is claimed is:

1. A method for implementing enhanced fast full synchronization for remote disk mirroring in a computer system comprising:

providing a source backup copy locally available to a target for remote disk mirroring;

identifying sectors that are different between the source and target using a hash function over a block to be compared, with an adaptive number of tracking sectors per block, starting with a minimum block size;

in response to hashes matching between source and target, increasing a block size by an integral number of tracking sectors; and in response to hashes not matching between source and target, setting the block size to the minimum tracking block size.

2. The method as recited in claim 1 wherein said hash function includes a selected cryptographic hash algorithm including SHA-1 (Secure Hash Algorithm 1) or SHA-2 (Secure Hash Algorithm 2).

3. The method as recited in claim 1 includes initializing the target and loading a backup copy on the target, and setting the minimum block size to a minimum tracking sector, and setting a tracking sector pointer to the tracking sector 1.

4. The method as recited in claim 3 includes initializing the source and creating a tracking space with all bits set to zero, and setting the tracking sector pointer to the tracking sector 1.

5. The method as recited in claim 1 includes computing a block hash on the target, based on the tracking sector pointer and the block size, and sending a message to the source including the computed hash, the tracking sector pointer and the block size.

6. The method as recited in claim 5 includes on the source, receiving the message from the target, computing a corresponding block hash based on the tracking sector pointer and the block size, comparing the computed corresponding block hash with the hash received from the target, and sending a match or no match message to the target.

7. The method as recited in claim 6 includes a response to matching hashes, such that the source increments the tracking sector pointer by the number of tracking sectors in the block and the target increments the tracking sector pointer by the number of tracking sectors in the block, and the target increases the block size unless a maximum block size has been reached or when there are fewer remaining tracking sectors than the increased block size, the block size is set to the number of remaining tracking sectors.

8. The method as recited in claim 6 includes a response to hashes which do not match, such that the source sets the corresponding tracking space bits to 1, indicating the tracking sectors are to be sent, the tracking sector pointer is incremented by the minimum block size, the target keeps the block size set to the minimum block size and increments the tracking sector pointer by the minimum block size.

9. The method as recited in claim 8 includes a response to the block size not being equal to the minimum block size, such that the source keeps the tracking sector pointer unchanged and waits for the message from the target including the computed hash, the tracking sector pointer and the block size, and the target keeps the tracking sector pointer unchanged and changes the block size to the minimum block size.

* * * * *